United States Patent [19]

Behr

[11] 4,091,155
[45] May 23, 1978

[54] CONTOURED WORK TOP

[76] Inventor: Joseph Henry Behr, 4000 deMaisonneuve, Westmount, Quebec, Canada, H3Z 1J9

[21] Appl. No.: 818,196

[22] Filed: Jul. 22, 1977

[51] Int. Cl.² ............................ B32B 3/30; B32B 3/28
[52] U.S. Cl. ................................. 428/167; 113/116 G; 219/87; 228/181; 228/182; 428/182; 428/188; 428/603; 428/604
[58] Field of Search ........... 428/167, 172, 188, 166 V, 428/182, 603, 604; 113/116 Y, 116 G, 116 HH; 29/401; 228/181, 173 L, 182; 219/87

[56] References Cited
U.S. PATENT DOCUMENTS

| 3,655,502 | 4/1972 | Yoshikawa | 428/167 |
| 4,053,969 | 10/1977 | Bayard | 228/181 |

Primary Examiner—Edward G. Whitby
Attorney, Agent, or Firm—Larson, Taylor and Hinds

[57] ABSTRACT

A contoured work top is provided as a new or replacement work surface to fit over an existing support structure such as a desk or table. The work top has a flat sheet of structural material with a top surface and a bottom surface. A second sheet of structural material is provided having a plurality of spaced apart, parallel raised ribs extending across the second sheet which is rigidly connected to the lower surface at tips of the raised ribs thus supporting the second sheet a spaced apart distance from the flat sheet. Also included is at least one flat strip of structural material extending across the second sheet perpendicular to the raised ribs and rigidly connected to the second sheet at locations between the raised ribs. The work top may also have side walls extending downwards from the edges of the flat sheet beyond the second sheet adapted to retain the work top in place on a supporting structure.

10 Claims, 3 Drawing Figures

CONTOURED WORK TOP

This invention relates to a work top, and more particularly to an improved contoured work top for locating on a new or existing support structure. By the term "contoured" is meant the adapting of a work top to fit over the existing top of a support structure. Removable or replacement work tops are known. Such work tops are used for example, as replacement tops to provide a new working surface on old desks. The work tops may also be used to provide work surfaces using spaced-apart or adjacent filing cabinets, or other similar structures, as supports for the work tops.

The known work tops or replacement tops have certain disadvantages. One disadvantage is that existing work tops are often made of wood and therefore, are relatively thick to provide the required degree of rigidity. These thick work tops either raise the height of the working surface, or require the removal of the old working surface before installation of the new work top, thus resulting in additional labour. Furthermore, the thick work tops require a means to secure them to the supporting structure, which operation is time consuming and may also damage the supporting structure.

More recently work tops have been formed out of sheet metal with a plastic laminate bonded to the surface. However, it has been found that the plastic laminate tends to distort with humidity and heat variation, thus the work top sometimes warps resulting in an uneven surface, or delamination may occur between the sheet steel and the plastic laminate.

It is the purpose of the present invention to provide contoured work tops which eliminate or minimize the disadvantages of the known work tops. The contoured work tops are made of structural sheet metal joined together in a manner that gives the work top sufficient structural rigidity and yet has a greatly reduced core thickness. Thus the contoured work tops can be placed on top of the used tops of desks without uncomfortably increasing the working height of the desk or increasing the width and length of the desk. At the same time, the contoured work tops have sufficient structural rigidity to prevent warping when a plastic laminate is bonded to the metal surface. It is another purpose of the present invention to provide work tops with a thin core thickness which need not be fastened to support structures, but which have side walls extending down below the top surface of the support structure and thus retain the work top in place.

The work top employs a novel structure thus providing a relatively thin core thickness having strength and rigidity. Also, the work top is made with an exterior skirt or side walls about the edges which retains the work top in position on its support structure without requiring fastening means. The side walls fit snugly over the support structure thus containing the work top to the support structure.

The present invention provides a contoured work top comprising a flat sheet of structural material having a top surface and a bottom surface, a second sheet of structural material having a plurality of spaced apart parallel ribs extending across the second sheet, the second sheet being rigidly connected to the lower surface at tips of the ribs thus supporting the second sheet at a spaced apart distance from the flat sheet, and a plurality of flat strips of structural material extending across the second sheet perpendicular to the ribs and rigidly connected to the second sheet at locations between the ribs. In another embodiment, side walls of structural material are included, joined to edges of the flat sheet and bent downwards beyond the second sheet, adapted to contour the work top to a supporting structure. Also provided in another embodiment is a decorative material in the form of a high pressure plastic sheet laminated to the top surface of the work top.

In drawings which illustrate embodiments of the invention,

Figure 1:
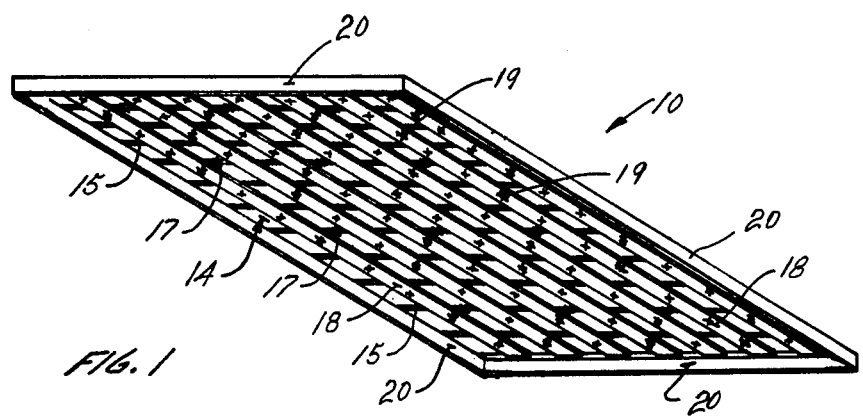
FIG. 1 is a perspective view of the underside of one embodiment of a contoured work top of the present invention.
Figure 2:
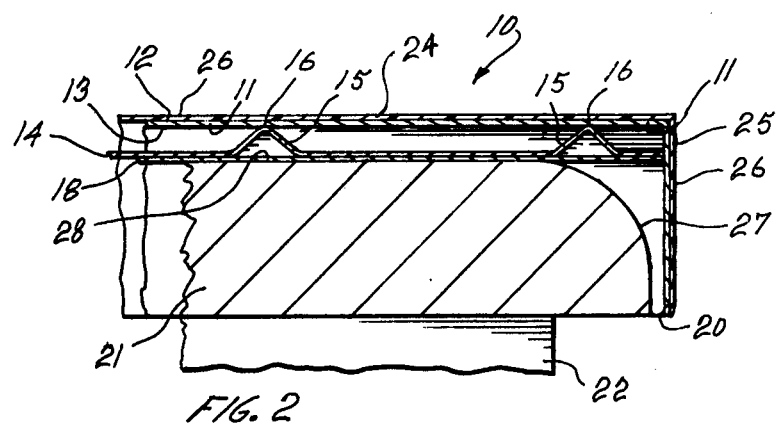
FIG. 2 is a cross sectional detail view of the work top shown in FIG. 1 mounted on a desk.

Referring now to FIGS. 1 and 2, the contoured work top 10 has a flat sheet 11 of structural material, preferably sheet steel, which has a top surface 12 and a bottom surface 13. The flat sheet 11 is contoured to just cover the work top support structure or structures as will be described.

A second sheet 14 of structural material, again preferably sheet steel and a lighter gauge than the flat sheet 11, has a series of equally spaced apart, parallel ribs 15 or corrugations, which are preferably V-shaped and have a tip ridge 16 which touches and is rigidly connected to the bottom surface 13 of the flat sheet 11. The connections are formed by welds 17 at locations along the tip ridges 16 of the ribs 15. The ribs 15 are preferably made on a press brake to ensure even depth and accurate spacing. The ribs 15 give rigidity to the structure in a plane parallel to the ribs 15, but do not give rigidity in a place perpendicular to the ribs 15 because the strength is restricted to the thickness of the sheet 14 at the tip ridge 16. To strengthen the structure in this plane, a plurality of flat strips 18 of structural material, preferably sheet steel are positioned parallel and approximately an equal distance apart across the second sheet 14 substantially perpendicular to the ribs 15. The flat strips 18 are rigidly connected to the second sheet 14 by welds 19 located between each rib 15 so the structure is rigid in all planes. In a preferred embodiment there are approximately the same number of flat strips 18 as there are ribs 15 in the second sheet 14.

To increase the rigidity of the structure and to provide a means for retaining the work top 10 on a support structure, side walls 20 or retaining skirts are provided along the edges of the flat sheet 11 bent downwards beyond the second sheet 14 to give an indication of thickness to the work top 10. As may be seen in FIG. 2, the side walls 20 extend down below the desk top 21 of a desk 22 and thus hide the desk top 21. In a preferred embodiment, the flat sheet 11 and the side walls 20 are integral and made from a single sheet of steel. The side walls 20 are bent on a press brake.

The top surface 12 of the flat sheet 11 provides the work surface of the contoured work top 10. The surface 11 may be painted or otherwise treated if desired. Preferably, however, in accordance with the present invention, a sheet 24 of decorative material such as a high pressure plastic sheet is provided which is laminated to the top surface 12 of the flat sheet 11. A suitable bonding agent such as a rubber based contact cement may be used for the laminating step. Strips 25 of decorative material are also laminated to the outside surfaces of side walls 20. The sheet 24 and strips 25 of decorative material have a work surface 26. The work surface 26 may be provided with an imitation wood grain appearance or with any other desired appearance. The corners between the sheet 24 and strips 25 of decorative material may be molded to form an integral layer.

The sheet 24 and strips 25 of decorative material are liminated to the work top 10 after completion of the welding. The rigidity of the structure of the work top is such that warping of the flat sheet 11 does not occur even when there is a variation in humidity and/or temperature. Furthermore, the bonding between the sheet 24 and strips 25 of decorative material and the flat sheet 11 is sufficiently strong that delamination does not occur.

Figure 3:
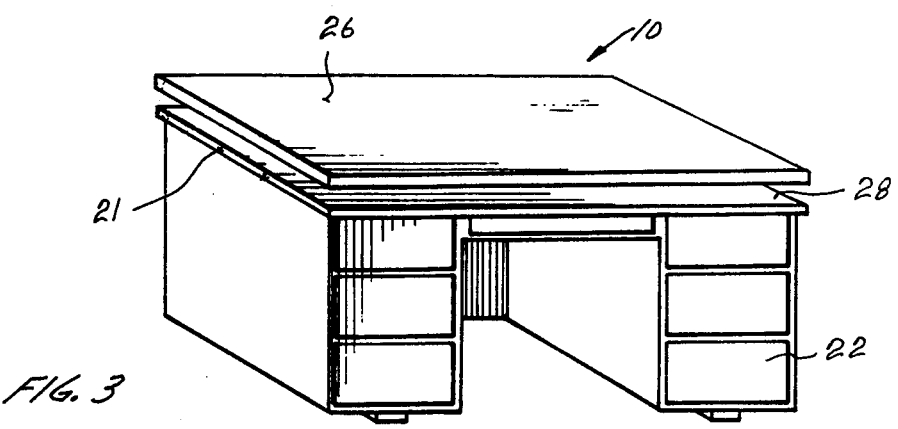
FIG. 3 is a perspective view showing a contoured work top positioned directly above the top of a desk.

The contoured work top 10 is particularly suited to provide a new work surface on an old desk 22 as shown in FIGS. 2 and 3. The work top 10 is contoured to have the side walls 20 just fit about the peripheral edge 27 of the desk top 21. The work top 10 sits on the top surface 28 of the old desk top 21 with the flat strips 18 resting on the top surface 28. The side walls 20 hide the old desk top 21 and hold the work top 10 in position cooperating with the four peripheral edges 27 of the desk top 21 to prevent the work top 10 from sliding around. The work top 10 is heavy enough, being made from structural material, to sit on the desk under its own weight and not require fastening means to hold it down. If desired, however, it could be fastened mechanically or glued. The work top 10 has a thin core thickness, and does not markedly increase the working height of the desk 21 when mounted on top of the old desk top 21. In one embodiment, the work top 10 has a thickness between the top surface 26 of the decorative material sheet 24 and the bottom of the flat strips 18 of about a quarter of an inch.

In this embodiment, the flat sheet 11 is made from 18 gauge steel sheet, and the second sheet 14 and plurality of flat strips 18 were formed from 26 gauge steel sheet.

While the contoured work top 10 has been shown as providing a new top for an old desk, it is to be understood that the work top 10 may also be used in other ways. It could, for example, be used to provide a work surface utilizing two spaced apart file cabinets as end supports for the top. The work top 10 could also have shapes other than rectangular and could be used in an inclined as well as a flat position. Thus for example, the work top 10 could be used to provide an inclined drafting table work surface. The work top 10 is portable in the sense that it is loosely mounted since it need not be fastened to its supports, and thus can be easily moved. However, the work top 10 could, if desired, be detachably fastened to its end supports by suitable fastening means, in accordance with the present invention. Another use for the work top 10 is as a shelf or desk top when supported by brackets attached to room divider panel units, such as the type disclosed in my co-pending application Ser. No. 794,373 filed May 6, 1977.

The work top 10 may be shape formed on the top surface rather than flat to produce shape formed articles such as kitchen counter tops. In such an embodiment, the flat sheet of the work top is first contoured to the desired shape.

The embodiments of the invention in which an exclusive property or privilege is claimed are defined as follows:

1. A contoured work top comprising a flat sheet of structural material having a top surface and a lower surface, a second sheet of structural material having a plurality of spaced apart parallel ribs with tip ridges extending across the second sheet, the second sheet being rigidly connected to the lower surface by the tip ridges of the ribs thus supporting the second sheet at a spaced apart distance from the flat sheet, and a plurality of flat strips of structural material extending across the second sheet perpendicular to the ribs and rigidly connected to the second sheet at locations between the ribs.

2. The contoured work top of claim 1 including side walls of structural material joined to edges of the flat sheet and bent downwards beyond the second sheet adapted to retain the work top in place on a supporting structure.

3. The contoured work top of claim 2 including a decorative material laminated to the top surface of the flat sheet and outside surfaces of the side walls.

4. The contoured work top of claim 3 wherein the decorative material is a high pressure plastic sheet and a rubber based contact cement laminates the plastic sheet to the top surface of the flat sheet and the outside surfaces of the side walls.

5. The contoured work top of claim 1 wherein all the structural materials are sheet steel, the second sheet is rigidly connected to the flat sheet by welding and the flat strip is attached to the second sheet by welding.

6. The contoured work top of claim 2 wherein the flat sheet of structural material is sheet steel and the side walls are formed integral with the flat sheet by being bent downwards at an angle of 90°.

7. The contoured work top of claim 6 wherein the flat sheet and the side walls are integrally formed from a single steel sheet on a press brake.

8. The contoured work top of claim 1 wherein the second sheet has a plurality of V-shaped corrugations representing the spaced apart, parallel ribs, and wherein there are approximately the same number of V-shaped corrugations as flat strips.

9. The contoured work top of claim 8 wherein the second sheet is steel and the ribs are formed on a press brake.

10. The contoured work top of claim 1 wherein the flat sheet is contoured to a desired shape to produce a shape formed article.

* * * * *